United States Patent
Kouda

(10) Patent No.: US 10,564,908 B2
(45) Date of Patent: Feb. 18, 2020

(54) OPERATION TERMINAL, PROGRAM, AND PRINTING SYSTEM

(71) Applicant: Oki Data Corporation, Tokyo (JP)

(72) Inventor: Shun Kouda, Tokyo (JP)

(73) Assignee: Oki Data Corporation, Tokyo (JP)

(*) Notice: Subject to any disclaimer, the term of this patent is extended or adjusted under 35 U.S.C. 154(b) by 0 days.

(21) Appl. No.: 16/161,688

(22) Filed: Oct. 16, 2018

(65) Prior Publication Data

US 2019/0114129 A1 Apr. 18, 2019

(30) Foreign Application Priority Data

Oct. 18, 2017 (JP) ................................. 2017-201459

(51) Int. Cl.
*G06F 3/12* (2006.01)

(52) U.S. Cl.
CPC .......... *G06F 3/1292* (2013.01); *G06F 3/1204* (2013.01); *G06F 3/1244* (2013.01); *G06F 3/1253* (2013.01); *G06F 3/1268* (2013.01)

(58) Field of Classification Search
CPC ............................. G06F 3/1292; G06F 3/1204
See application file for complete search history.

(56) References Cited

U.S. PATENT DOCUMENTS

| 4,484,303 A | * | 11/1984 | Provanzano | G05B 19/05 700/18 |
| 2007/0124713 A1 | * | 5/2007 | Ando | G06T 7/001 250/307 |
| 2011/0145107 A1 | * | 6/2011 | Greco | G06Q 10/08 705/27.2 |
| 2012/0243041 A1 | * | 9/2012 | Sakurai | G06F 3/1208 358/1.15 |

FOREIGN PATENT DOCUMENTS

JP 2015-162176 A 9/2015

* cited by examiner

*Primary Examiner* — Ibrahim Siddo
(74) *Attorney, Agent, or Firm* — Metrolex IP Law Goup, PLLC

(57) ABSTRACT

One of embodiments is an operation terminal connectable with a printing device. The operation terminal includes: a communication unit that communicates with the printing device; an input unit that accepts input of an instruction; and a control unit. The control unit is configured, when the input unit receives input of an instruction to execute a predetermined processing in which target data is generated other than an instruction to execute printing while the control unit is executing a preset function, to execute the predetermined processing and generate a printing job to cause the printing device to perform printing based on the target data generated by the predetermined processing.

16 Claims, 4 Drawing Sheets

US 10,564,908 B2

OPERATION TERMINAL, PROGRAM, AND PRINTING SYSTEM

CROSS REFERENCE TO RELATED APPLICATIONS

This application claims priority based on 35 USC 119 from prior Japanese Patent Application No. 2017-201459 filed on Oct. 18, 2017, entitled "OPERATION TERMINAL, PROGRAM, AND PRINTING SYSTEM", the entire contents of which are incorporated herein by reference.

BACKGROUND

The disclosure relates to an operation terminal, a program, and a printing system.

A printing system is known in which a mobile terminal generates printing data and sends the printing data to a printer and the printer performs printing of the printing data (e.g., see Patent Document 1). In the case of printing a message in e-mail (electronic mail), the related art as recited above requires the mobile terminal to create a portable document format (PDF) file of the e-mail screen in itself, save that file as image data, receive a selection of the image data from a user, and transmit the selected image data to the printer.

Patent Document 1: Japanese Patent Application Publication No. 2015-162176

SUMMARY

As described above, in the case of printing the message in the e-mail, for example, the related art requires the user to perform a number of operations due to the necessity to generate, save, select, and transmit the image data, and imposes large burden on the user.

An object of one embodiment of the disclosure is to realize printing efficiently with an operation terminal of a user.

A first aspect is an operation terminal connectable with a printing device that includes: a communication unit that communicates with the printing device; an input unit that receives input of an instruction; and a control unit configured, when the input unit receives input of an instruction to execute a predetermined processing in which target data is generated other than an instruction to execute a printing while the control unit is executing a preset function, to execute the predetermined processing and generate a printing job to cause the printing device to perform printing based on the target data generated by the predetermined processing.

A second aspect is a non-transitory computer-readable storage medium that stores a program, the program causing a computer to perform operations comprising: operation as a communication unit that communicates with a printing device; operation as an input unit that receives input of an instruction; and operation as a control unit configured, when the input unit receives input of an instruction to execute a predetermined processing in which target data is generated other than an instruction to execute a printing while the control unit is executing a preset function, to execute the predetermined processing and generate a printing job to cause the printing device to perform printing based on the target data generated by the predetermined processing.

A third aspect is a printing system that includes: an operation terminal; and a printing device that performs printing based on a print job. The operation terminal includes: a communication unit that communicates with the printing device; an input unit that receives input of an instruction; and a control unit configured, when the input unit receives input of an instruction to execute a predetermined processing in which target data is generated other than an instruction to execute a printing while the control unit is executing a preset function, to execute the predetermined processing and generate a printing job to cause the printing device to perform printing based on the target data generated by the predetermined processing.

DETAILED DESCRIPTION

Figure 1:
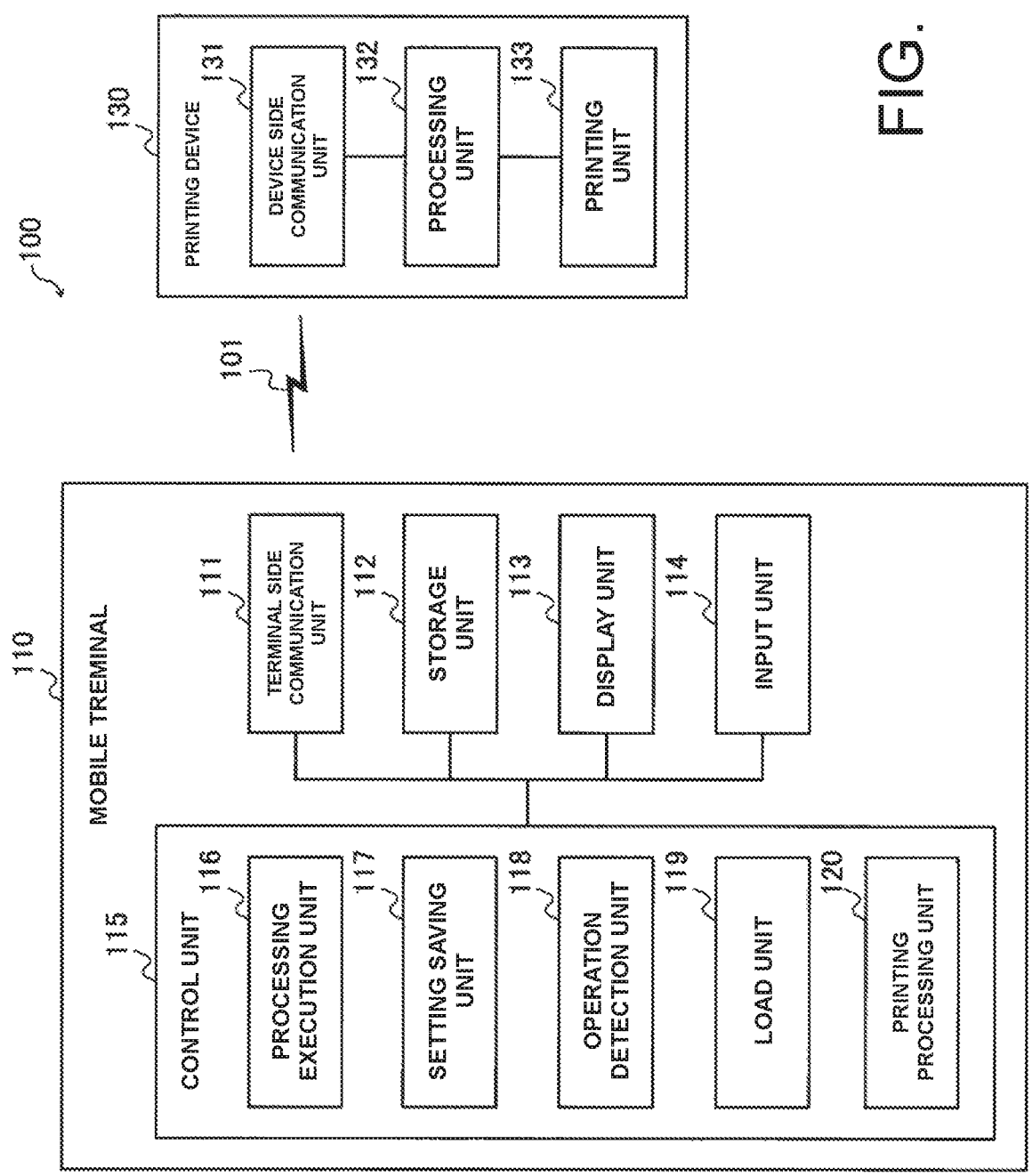
FIG. 1 is a block diagram schematically illustrating a configuration of a printing system according to one embodiment.

Embodiments are explained with referring to drawings. In the respective drawings referenced herein, the same constitutions are designated by the same reference numerals and duplicate explanation concerning the same constitutions is basically omitted. All of the drawings are provided to illustrate the respective examples only. No dimensional proportions in the drawings shall impose a restriction on the embodiments. For this reason, specific dimensions and the like should be interpreted with the following descriptions taken into consideration. In addition, the drawings include parts whose dimensional relationship and ratio are different from one drawing to another.

FIG. 1 is a block diagram schematically illustrating a configuration of a printing system 100 according to one embodiment. The printing system 100 includes a mobile terminal 110 as an operation terminal and a printing device 130 as a printer. The mobile terminal 110 and the printing device 130 are connected by a wireless network 101; however, they may be connected by wire. The mobile terminal 110 is thus connectable with the printing device 130.

The mobile terminal 110 includes a terminal side communication unit 111, a storage unit 112, a display unit 113, an input unit 114, and a control unit 115.

The terminal side communication unit 111 is a communication interface for communicating with the printing device 130. In one embodiment, the terminal side communication unit 111 is a wireless local area network (LAN) communication interface that communicates with the printing device 130 using the wireless network 101.

The storage unit 112 or a memory stores data required for processing by the mobile terminal 110. For example, the storage unit 112 stores image data obtained as a screenshot.

The display unit 113 or a display displays various screen images. The input unit 114 or a user interface such as a button(s) and/or a key(s) receives input operation by the user. For example, the display unit 113 and the input unit 114 may be a touch panel or a user interface.

The control unit 115 or a controller controls the processing operated by the mobile terminal 110. For example, the control unit 115 is configured, when the input unit 114 receives an instruction to execute a predetermined processing in which target data is generated other than an instruction to execute printing while the control unit is executing one of preset functions, to execute the predetermined processing and generates a printing job to cause the printing device 130 to perform printing based on the target data. The control unit 115 then causes the terminal side communication unit 111 to transmit the printing job to the printing device 130. The printing job in this case is data to perform printing based on the target data.

The control unit 115 includes a processing execution unit 116, a setting saving unit 117, an operation detection unit 118, a load unit 119, and a printing processing unit 120.

In response to the instruction from the user received through the input unit 114, the processing execution unit 116 executes the processing instructed by the user. For example, when the input unit 114 receives the instruction from the user to take (capture) a screenshot, the processing execution unit 116 generates image data of a screen image displayed on the display unit 113 and stores the generated image data in the storage unit 112. It is assumed that the image data includes data indicating date and time of that image generation. In one embodiment, when the instruction to take a screenshot is received, image data of the entire screen image displayed on the display unit 113 is generated.

The setting saving unit 117 is a setting unit that sets a first condition for executing an automatic printing function that causes the mobile terminal 110 to automatically generate the printing job and transmit the printing job to the printing device 130. For example, the setting saving unit 117 receives input of the setting of the first condition for executing the automatic printing function from the user through the display unit 113 and the input unit 114 and saves (stores) that first condition in the storage unit 112.

Figure 2:
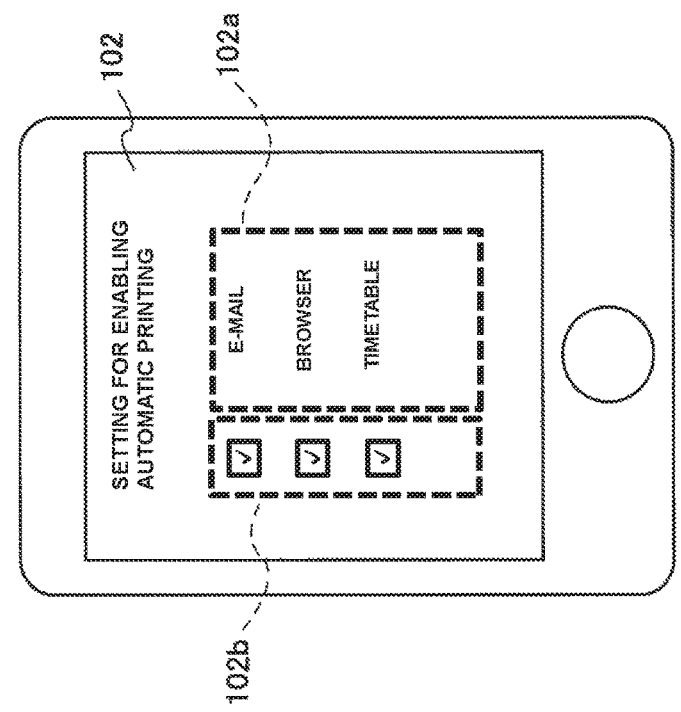
FIG. 2 is a schematic view illustrating an example of a setting screen image of one embodiment.

Specifically, the setting saving unit 117 causes the display unit 113 to display a setting screen image 102 illustrated in FIG. 2 and receives the input of the setting from the user through the input unit 114. As illustrated in FIG. 2, the setting screen image 102 includes a display region 102a for displaying application names, which are identification information for identifying applications (application identification information) and a selection region 102b having check boxes for selecting one or more of the applications identified by the application names displayed in the display region 102a for executing the automatic printing function. For example, in a case where the user puts a check mark in one of the check boxes displayed in the selection region 102b through the input unit 114, execution of the application identified by the application name displayed on the right side of that check box with the check mark is set as the first condition for the automatic printing function.

In this case, the applications are programs executable by the control unit 115 to perform functions. The control unit 115 is configured to realize each function by executing each program. Thus, the application names displayed in the display region 102a indicate function names of functions executable by the control unit 115, which are function names of candidate functions that can be selected by the user. The candidate functions (candidate applications) are, for example, as illustrated in FIG. 2, an e-mail function of generating and transmitting e-mail (e-mail application), a browser function of viewing a webpage (browser application), and a timetable display function of displaying a timetable of transportation (timetable display application).

Another function (another application) that is not illustrated may be included in addition to these functions. For example, a text editing function of editing text (text editing application) may be included.

As described above, the first condition for executing the automatic printing function is execution of one of the application(s) that is(are) preset in advance. In other words, the first condition for executing the automatic printing function is execution of the function of one of the application(s) that is(are) preset through the setting screen 102 or preset as a default setting.

Referring back to FIG. 1, the operation detection unit 118 monitors operation by the user and detects whether the first condition and a second condition for executing the automatic printing function are satisfied. For example, the operation detection unit 118 monitors input into the input unit 114. Here, the second condition for executing the automatic printing function is to receive input of an instruction to execute a predetermined processing in which the target data is generated, other than an instruction to execute printing, into the input unit 114 by the user. In one embodiment, the second condition for executing the automatic printing function is the input of the instruction to take a screenshot into the input unit 114 from the user.

When the operation detection unit 118 detects that both the first and second conditions are satisfied, the load unit 119 reads the latest image data stored in the storage unit 112 as the target data. The load unit 119 then generates the printing confirmation screen image including a thumbnail of the read target data and causes the display unit 113 to display the printing confirmation screen image.

When the input unit 114 receives input of confirmation of printing from the user based on the printing confirmation screen image, the load unit 119 passes processing to the printing processing unit 120. When the input unit 114 receives input of confirmation of not performing printing from the user based on the printing confirmation screen image, the load unit 119 deletes the read target data and stops displaying the printing confirmation screen image.

After the printing confirmation screen image is displayed on the display unit 113, when the operation detection unit 118 detects the input of the instruction to take a screenshot into the input unit 114 before receiving the input of the confirmation from the user, the load unit 119 generates a notification screen image as notification that no printing processing is performed and causes the display unit 113 to display that image.

When the input unit 114 receives the input of the confirmation on printing processing from the user, the printing processing unit 120 generates the printing job for performing printing based on the target data read by the load unit 119 and causes the terminal side communication unit 111 to transmit that printing job to the printing device 130.

Figure 3A:
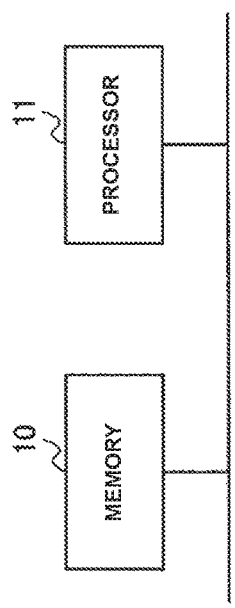
FIGS. 3A and 3B are schematic diagrams illustrating configuration examples of hardware of one embodiment.

A part or entirety of the control unit 115 above-described can include, for example, a memory 10 and a processor 11 such as a central processing unit (CPU) that executes a program stored in the memory 10 as illustrated in FIG. 3A. Such a program may be provided through a network or provided by being recorded in a recording medium. The storage unit 112 may be implemented by the memory 10 or implemented by a storage device other than the memory 10.

Figure 3B:
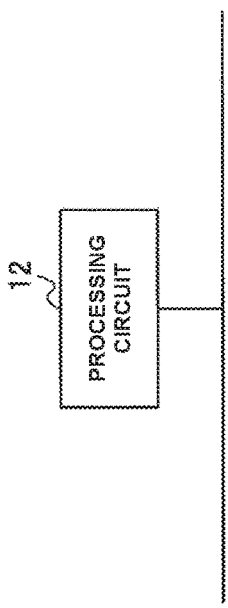

A part of the control unit 115 may include, for example, a processing circuit 12 such as a single circuit, a composite circuit, a programmed processor, a parallel-programmed processor, an application specific integrated circuit (ASIC), and a field programmable gate array (FPGA) as illustrated in FIG. 3B.

Referring back to FIG. 1, the printing device 130 includes a device side communication unit 131, a processing unit 132, and a printing unit 133.

The device side communication unit 131 is a communication interface for communicating with the mobile terminal 110. In this embodiment, the device side communication unit 131 includes a wireless LAN communication interface that communicates with the mobile terminal 110 using the wireless network.

The processing unit 132 receives the printing job that is received by the device side communication unit 131 and allows the printing unit 133 to print the target data based on that printing job. For example, based on the printing job, the processing unit 132 decompresses printing data corresponding to the target data and transmits that printing data to the printing unit 133 to allow the printing unit 133 to print the target data. In response to the instruction from the processing unit 132, the printing unit 133 prints the printing data.

A part or entirety of the processing unit 132 above-described can include, for example, the memory 10 and the processor 11 such as the CPU that executes an operation program stored in the memory 10 as illustrated in FIG. 3A. Such a program may be provided through a network or provided by being recorded in a recording medium.

A part or entirety of the processing unit 132 may include, for example, the processing circuit 12 such as a single circuit, a composite circuit, a programmed processor, a parallel-programmed processor, an ASIC, and an FPGA as illustrated in FIG. 3B.

Figure 4:
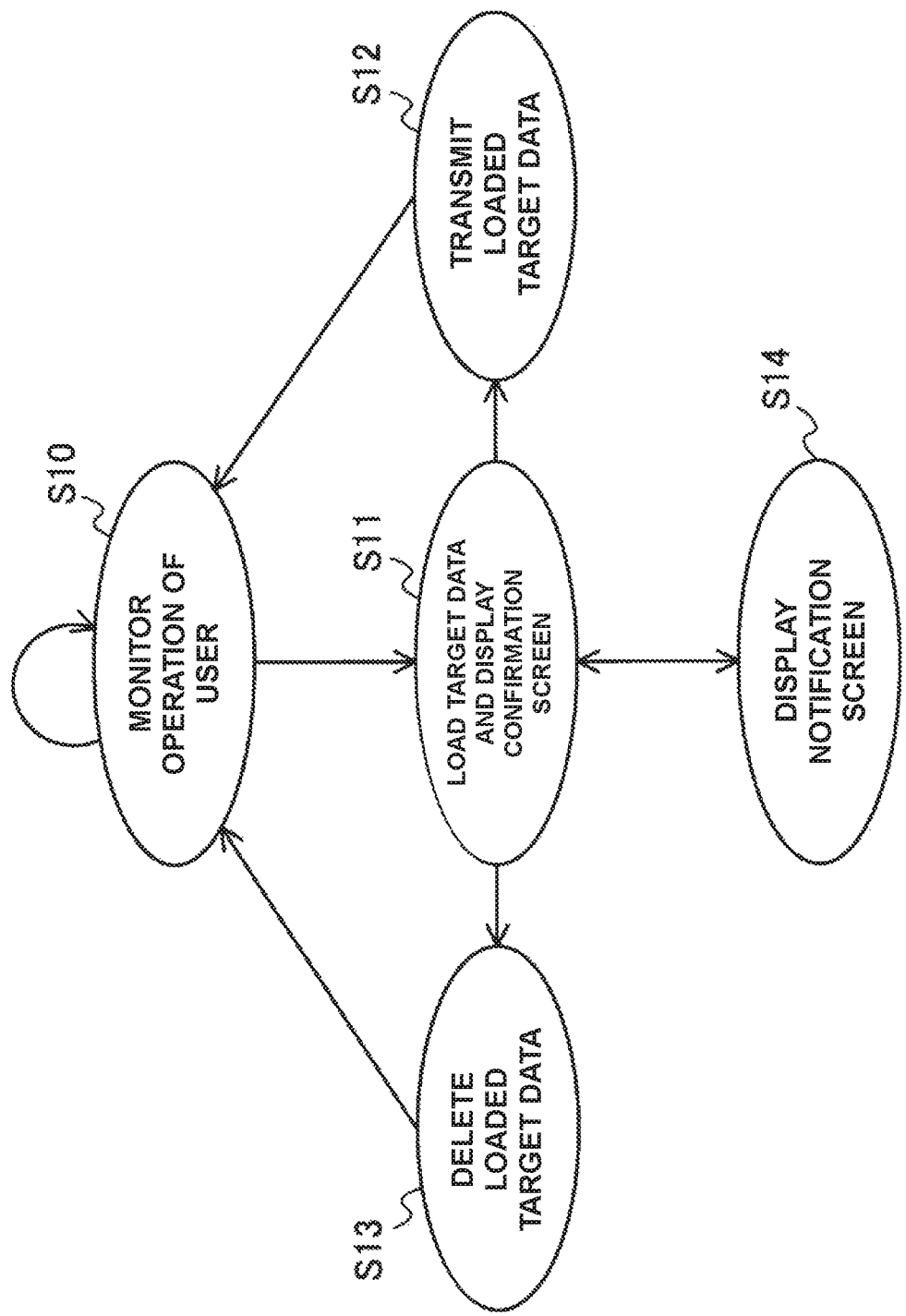
FIG. 4 is a diagram illustrating a state transition of a mobile terminal of one embodiment.

FIG. 4 is a diagram illustrating a state transition of the mobile terminal 110 according to one embodiment. It is assumed that, the user has set (selected) one or more preset applications through the setting screen image 102 illustrated in FIG. 2 in advance to enable the automatic printing function when taking a screenshot (a second condition) while operating one of the one or more preset applications (a first condition).

First, the operation detection unit 118 constantly monitors the operation by the user in the background by monitoring input into the input unit 114 (S10). When the operation detection unit 118 detects that the instruction to take a screenshot is inputted into the input unit 114 while executing the application for which the automatic printing function is enabled, the state of the mobile terminal 110 transits from the state S10 to a state S11. At that time, the processing execution unit 116 takes a screenshot and causes the storage unit 112 to store the image data generated from the screenshot.

In the state S11, the display unit 113 displays a preview of a printing result and displays the printing confirmation screen image for confirming whether to perform printing. For example, the load unit 119 determines the latest image out of the image data stored in the storage unit 112 as the image data generated from the screenshot and reads that image data as the target data. The load unit 119 thus generates the printing confirmation screen image including the thumbnail of the target data and causes the display unit 113 to display the printing confirmation screen image.

Figure 5:
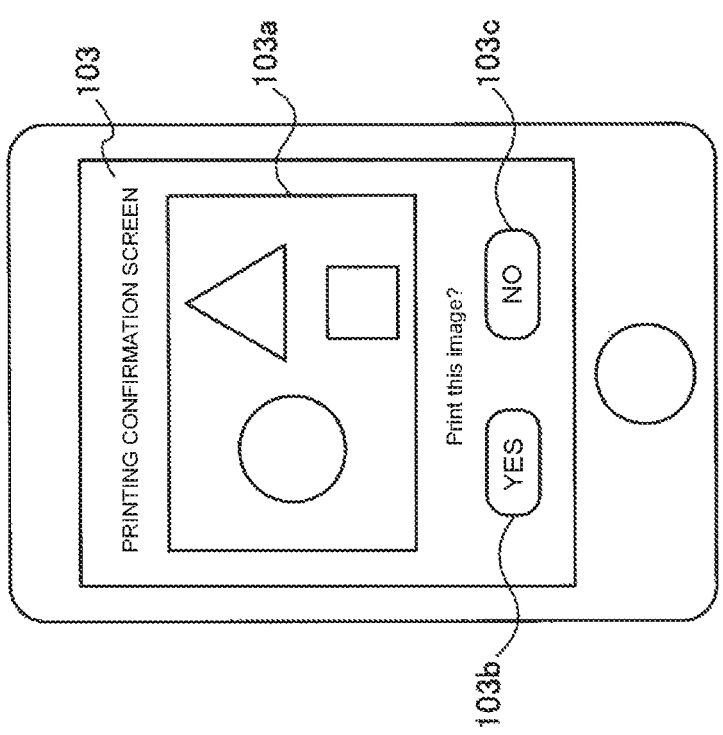
FIG. 5 is a schematic view illustrating an example of a printing confirmation screen image of one embodiment.

FIG. 5 is a schematic view illustrating an example of the printing confirmation screen image of one embodiment. The printing confirmation screen image 103 includes a display region 103a for displaying the thumbnail of the target data, a first button 103b as a printing confirmation input region for instructing to perform printing, and a second button 103c as a non-printing confirmation input region for instructing to not perform printing. When the user touches the first button 103b, the load unit 119 determines that an instruction to select the first button 103b is inputted, and thus the state S11 transitions to a state S12. On the other hand, when the user touches the second button 103c, the load unit 119 determines that an instruction to select the second button 103c is inputted, and thus the state S11 transitions to a state S13.

In the state S12, since the confirmation of executing printing processing is made from the operation by the user, the printing processing unit 120 makes an instruction to print the target data read by the load unit 119. For example, the printing processing unit 120 generates the printing job for performing printing based on the target data read by the load unit 119 and causes the terminal side communication unit 111 to transmit that printing job to the printing device 130. The printing device 130 receives that printing job and prints the target data based on the received printing job. After the printing processing unit 120 makes the printing instruction, the state S12 transitions to the state S10, and the operation detection unit 118 restarts monitoring of the user operation in the background.

In the state S13, since the confirmation of not executing printing processing is made from the operation by the user, the load unit 119 deletes the target data read from the storage unit 112. After the deletion of the target data, the state S13 transitions to the state S10, and the operation detection unit 118 restarts monitoring of the user operation in the background.

In the state S11, when the operation detection unit 118 detects that the user inputs an instruction to take a screenshot, that is, an instruction to take a screenshot for another purpose, before the user touches the first button 103b or the second button 103c, the state S11 transitions to a state S14.

In the state S14, the display unit 113 displays the notification screen image to notify that no printing is performed. For example, the notification screen image is generated by the load unit 119.

Figure 6:
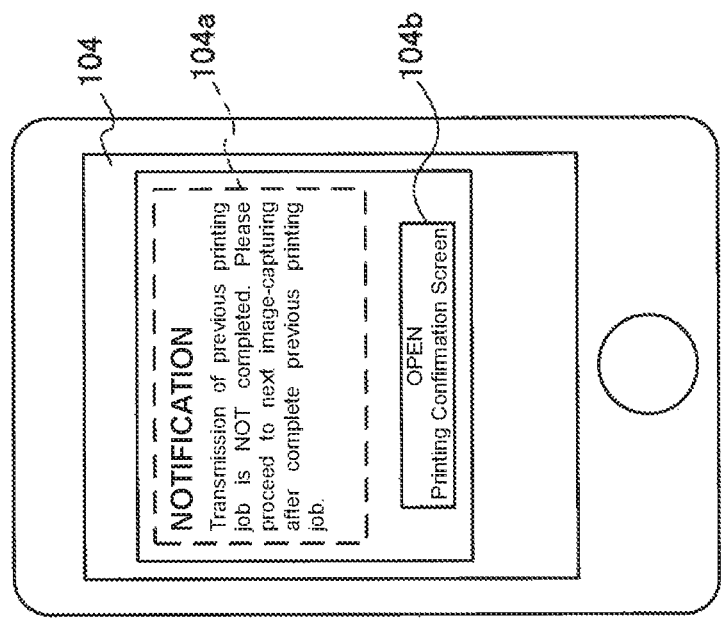
FIG. 6 is a schematic view illustrating an example of a notification screen image of one embodiment.

FIG. 6 is a schematic view illustrating an example of the notification screen image. The notification screen image 104 includes a display region 104a for displaying a message as notification that no printing is performed and a redisplay instruction region 104b for instructing to redisplay the printing confirmation screen. When the user touches the redisplay instruction region 104b, the load unit 119 determines that the instruction to select the redisplay instruction region 104b is inputted, the state S12 transitions to the state S11, and the display unit 113 displays the printing confirmation screen image 103 again. In the printing confirmation screen image 103, the thumbnail of the target data captured as a previous screenshot is displayed.

As described above, according to one embodiment, since the printing confirmation screen image for confirming whether to perform printing is automatically displayed by merely inputting the instruction to take a screenshot, the burden on the user is reduced. In addition, since the user can select an application for which the automatic printing function is to be enabled, it is possible to select the application to be ready to be printed in accordance with using purposes of the user by merely inputting the instruction to take a screenshot.

In one or more embodiments described above, the mobile terminal 110 is an example of the operation terminal; however, for example, an information processing device such as a personal computer (PC), a tablet and the like may be used as the operation terminal.

In addition, in one or more embodiments described above, the second condition for executing the automatic printing function is the input of the instruction to take a screenshot; however, the invention is not limited to such an example.

For example, when the mobile terminal 110 may include an image-capture unit (camera) which is not illustrated, the second condition for executing the automatic printing function may be an input of an instruction to execute imaging processing (imaging instruction) of performing image-capturing by the image-capture unit and generating the image data. In this case, the processing execution unit 116 controls the image-capture unit to perform image-capturing to generate image data of the captured image and causes the storage unit 112 to store the image data. The load unit 119 then reads the latest image data stored in the storage unit 112 as the target data.

Moreover, the second condition may be an instruction to execute copy processing of copying a part of text and the like as a screen image displayed on the display unit 113. In this case, the load unit 119 reads the data indicating the copied content from the storage unit 112 as the target data. When the copied content is a character string, the data indicating the content may be text data. When the copied content is an image, the data indicating the content may be image data. For example, once the input unit 114 receives the copy instruction, the processing execution unit 116 copies a part of the content displayed on the display unit 113, generates the text data or image data indicating the copied content, and stores that data in the storage unit 112.

According to an aspect of the disclosure, it is possible to realize the printing processing efficiently with the operation terminal of a user.

The disclosure includes other embodiments in addition to the above-described embodiments without departing from the spirit of the disclosure. The embodiments are to be considered in all respects as illustrative, and not restrictive. The scope of the disclosure is indicated by the appended claims rather than by the foregoing description. Hence, all configurations including the meaning and range within equivalent arrangements of the claims are intended to be embraced in the description.

The invention claimed is:

1. An operation terminal connectable with a printing device, comprising a processor that executes a program to function as:
   a communication unit that communicates with the printing device;
   an input unit that receives input of an instruction; and
   a control unit configured, in response to the input unit receiving input of an instruction other than an instruction to execute printing, to execute predetermined image generation processing in which target data is generated from a screen image displayed on a display unit while the control unit is executing a preset application among a plurality of applications executable by the control unit, to
   (i) execute the predetermined image generation processing,
   (ii) generate a printing job to cause the printing device to perform printing based on the target data generated by the predetermined image generation processing, and
   (iii) send the printing job to the printing device through the communication unit.

2. The operation terminal according to claim 1, wherein
   the predetermined image generation processing includes taking a screenshot to generate image data of the screen image displayed on the display unit.

3. The operation terminal according to claim 2, wherein the target data includes the image data.

4. The operation terminal according to claim 1, wherein
   the predetermined image generation processing includes copy processing of copying a part of the screen image displayed on the display unit.

5. The operation terminal according to claim 4, wherein the target data is data indicating a content copied by the copy processing.

6. The operation terminal according to claim 2, wherein
   the display unit displays a setting screen image in which one or more applications can be selected as the preset application from the plurality of applications executable by the control unit, and
   the input unit receives input of selecting at least one application as the preset application through the setting screen image.

7. The operation terminal according to claim 1, wherein
   the display unit displays a setting screen image in which one or more applications are to be selected, as the preset application, from the plurality of applications executable by the control unit, and
   the input unit receives input of selecting at least one application as the preset application through the setting screen image.

8. The operation terminal according to claim 7, wherein
   the plurality of applications include at least one of an e-mail application of generating and transmitting e-mail, a browser application of viewing a webpage, a timetable display application of displaying a timetable of transportation, and a text editing application of editing text.

9. The operation terminal according to claim 1, further comprising
   a storage in which one or more applications are registered, as the preset application for automatic printing, among the plurality of applications executable by the control unit.

10. The operation terminal according to claim 1, wherein
    the control unit displays, in response to receiving the input of the instruction to execute the predetermined image generation processing, on the display unit a confirmation screen for confirming whether to perform printing, and generates, in response to receiving the confirmation to perform printing, a printing job to cause the printing device to perform printing based on the target data generated by the predetermined image generation processing.

11. A non-transitory computer-readable storage medium that stores a program, the program causing a computer to perform operations comprising:
    operation as a communication unit that communicates with a printing device;
    operation as an input unit that receive input of an instruction; and
    operation as a control unit configured, in response to the input unit receiving an input of an instruction other than an instruction to execute printing, to execute predetermined image generation processing in which target data is generated from a screen image displayed on a display unit while the control unit is executing a preset application among a plurality of applications executable by the control unit, to (i) execute the predetermined image generation processing, (ii) generate a printing job to cause the printing device to perform printing based on the target data generated by the predetermined image generation processing, and (iii) send the printing job to the printing device through the communication unit.

12. A printing system comprising:
an operation terminal; and
a printing device that performs printing based on a printing job transmitted from the operation terminal, wherein
the operation terminal includes a processor that executes a program to function as;
a communication unit that communicates with the printing device;
an input unit that receives input of an instruction; and
a control unit configured, in response to the input unit receiving an input of an instruction other than an instruction to execute printing, to execute predetermined image generation processing in which target data is generated from a screen image displayed on a display unit while the control unit is executing a preset application among a plurality of applications executable by the control unit, to
(i) execute the predetermined image generation processing
(ii) generate a printing job to cause the printing device to perform printing based on the target data generated by the predetermined image generation processing, and
(iii) send the printing job to the printing device through the communication unit.

13. An operation terminal connectable with a printing device, comprising a processor that executes a program to function as:
a communication unit that communicates with the printing device;
an input unit that receives input of an instruction;
an image-capture unit that performs image-capturing to generate image data; and
a control unit configured, in response to the input unit receives input of an image-capturing instruction, other than an instruction to execute printing, to execute image-capturing to generate image data while a preset application among a plurality of applications executable by the control unit, to
(i) generate a target data from the image data generated by the image-capturing;
(ii) generate a printing job to cause the printing device to perform printing based on the target data, and
(iii) send the printing job to the printing device through the communication unit.

14. The operation terminal according to claim 13, further comprising
a storage in which one or more applications are registered, as the preset application for automatic printing, among the plurality of applications executable by the control unit.

15. The operation terminal according to claim 13, wherein
the control unit displays, in response to receiving the input of the instruction to execute image-capturing to generate image data, on a display unit a confirmation screen for confirming whether to perform printing, and generates, in response to receiving the confirmation to perform printing, the printing job to cause the printing device to perform printing based on the target data generated from the image data.

16. The operation terminal according to claim 13, wherein
the preset application comprises an application to perform the image-capturing by the image-capture unit.

* * * * *